Jan. 23, 1945.  V. WALKER  2,367,704
PREPARATION OF GLASS TESTING PIECES
Filed Dec. 26, 1940
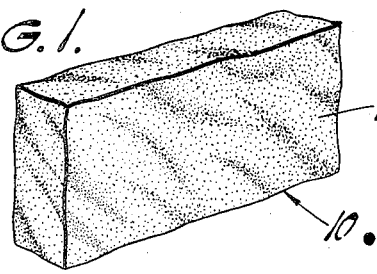
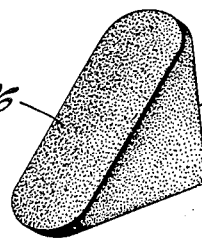
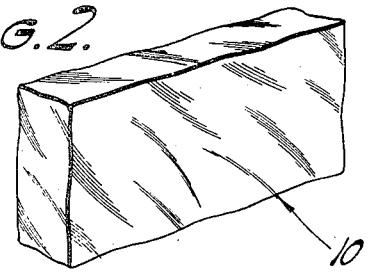
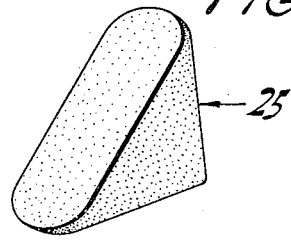
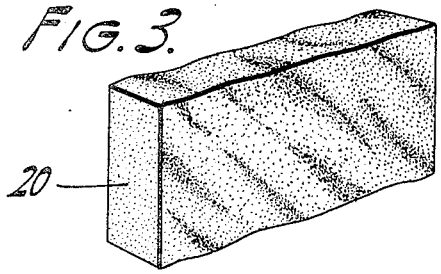
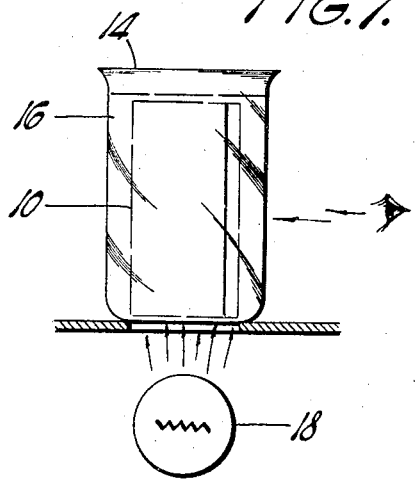
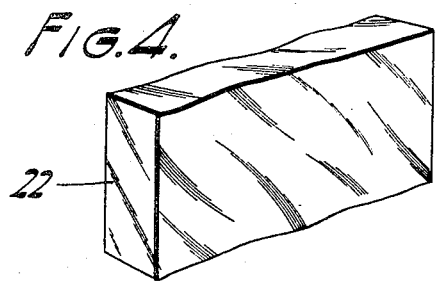
INVENTOR
VICTOR WALKER
BY
Bean, Brooks, Buckley & Bean.
ATTORNEYS Patented Jan. 23, 1945

2,367,704

UNITED STATES PATENT OFFICE 2,367,704

PREPARATION OF GLASS TESTING PIECES

Victor Walker, Fort Erie, Ontario, Canada, assignor to AlnCin, Inc., Buffalo, N. Y.

Application December 26, 1940, Serial No. 371,623

14 Claims. (Cl. 88—14)

This invention relates to methods for testing of glass stock or production blanks in connection with the selecting of suitable stock material for further processing into fine glassware, optical devices such as lenses, and the like. More specifically, the invention provides an improved method whereby glass stock may be prepared for visual inspection processes in an improved manner.

In connection with the manufacture of lenses and other optical devices and fine glassware and the like it is customary to select the glass stock to be processed into the finished product so as to be free of included foreign particles, bubbles, striae, and the like, so that the finished product will contain as few imperfections as possible. In some cases the product of the glass making furnace is first allowed to cool slowly into a solid mass form which is then broken into fragments, and suitable fragments thereof are then selected for remolding, pressing, cutting, or other processing into the desired finished form. In any case the stock selection process usually involves a visual inspection of the interiors of available fragments by means of transmitted light for the purpose of detecting evidences of internal imperfections such as undesirable strain, striae, or inclusions of foreign substances, gas bubbles, or the like.

It is sometimes customary to remelt selected stock fragments and to mold or press them in clay or metal molds so as to form the stock material into the form of blocks or roughly into the form of the product to be made. Upon removal from the molds these blocks or production blanks are found to comprise glass bodies which have been modified in the region of their surface portions by reason of contact with the mold material in such manner as to appear to be enclosed by rough surfaced "skins" of substantially opaque form. In accord with inspection methods of the prior are such test blocks or blanks are sometimes submerged wtihout further preparation in a suitable liquid having the properties of a wetting agent with respect to the surfaces thereof to the end that surface diffusion interferences will be eliminated, and thus a clearer view of the interior of the test block is obtainable. However, when high quality is required the block or blank is first subjected to some type of "skin" removal process such as a conventional optical type grinding and polishing at opposed side portions so that it will be possible to look through them either with the naked eye or with the assistance of instruments to detect the presence of striae or other imperfections as explained hereinabove. Unfortunately, the above described methods of preparation for testing purposes involve the employment of relatively tedious and skillful and expensive grinding and polishing processes; and it is the primary object of the present invention to provide a simplified and improved and less expensive method for preparing glass stock pieces for optimum visual inspection purposes, and to otherwise avoid the objections and disadvantages of the methods of the prior art hereinabove set forth. Other objects and advantages of the invention will appear in the specification hereinafter.

In the drawing:

Fig. 1 is a perspective of a block of glass stock as it emerges from a clay mold prior to its preparation for inspection purposes, as explained hereinabove;

Fig. 2 is a view showing the test block of Fig. 1 subsequent to treatment in accord with my novel process in preparation for visual inspection;

Fig. 3 is a view of a test block of the original form illustrated in Fig. 1 which has been subjected to a planing process at opposed side portions, in accord with a step of another form of the method of the invention;

Fig. 4 is a view corresponding to Fig. 2 illustrating the form of the test block of Fig. 3 after it has been subjected to the final step of the preparation method of the invention;

Fig. 5 is a perspective of a production blank which has been pressed into the general form of a prism preparatory to subsequent finishing operation thereon;

Fig. 6 is a view of the blank of Fig. 5 after it has been treated in accord with the method of the invention, preparatory to inspection thereof; and Fig. 7 is a diagrammatic view of a visual inspection step of the invention.

In practicing the present invention the stock piece to be visually inspected is subjected to a novel surface clarifying operation in lieu of the customary grinding and polishing processes of the prior art as explained hereinabove. For example, as illustrated by Fig. 1, the stock piece may be provided in the form of a test block 10 which is enclosed at its outer surface portions by a rough and substantially opaque skin 12, whereby it is impossible to see into the interior of the block to a degree that would be satisfactory for visual inspection purposes. According to the present invention I submerge the block 10 in, or otherwise apply to the surface portions thereof, a novel acid composition for the purpose of removing the light screening substances from the skin portion of the test block, without introduction of other deleterious effects such as reflection characteristics, or the like. For this purpose I provide the acid composition in accord with the chemical characteristics of the glass stock piece. For example, if the glass of the test block is of the so called sodium silicate or calcium silicate type, my acid composition will comprise a mixture of hydrofluoric and sulphuric acids in water; the sulphuric acid ingredient being present in an amount equal to approximately five times the amount of hydrofluoric acid. On the other hand, if the test block is of glass commonly known as the barium silicate type, the acid composition of my surface treating method will comprise a mixture of phosphoric and hydrofluoric acids in water, in which the ratio of phosphoric acid to hydrofluoric acid is approximately five to one.

In either case, I have found that by so treating the skin portion of the stock test piece, it will become clarified to maximum light transmitting condition without harmful effect upon the glass stock and without development of surface specular reflection characteristics which would deter subsequent inspection processes.

Fig. 2 illustrates the form of the test block of Fig. 1 subsequent to the surface clarifying process. In many instances the test block, when processed as just described and when in the form illustrated by Fig. 2, will be suitable for visual inspection purposes in dry condition; that is, without wetting of its surfaces or submerging it in a wetting bath as explained hereinabove. However, if preferred, the test block of Fig. 2 may be submerged as illustrated in Fig. 7 in a vessel 14 containing a suitable wetting solution 16 such as xylol, or the like; and by means of light projected from any suitable light source such as at 18 the interior of the block will be illuminated and exposed to view in a manner comparing favorably with the results obtained by the methods of the prior art. Obviously the expense of preparing the test block 10 for visual inspection will be substantially less than in connection with the preparation of a similar test block in accord with the grinding and polishing steps of the prior art, as explained hereinabove.

In some cases it may be preferred to rough grind or cut the production blank or test block towards its desired ultimate contour as an intermediate step of the manufacture thereof prior to its inspection, and in such cases the roughly shaped blank may then be subjected to the acid surface clarifying step of the method of the invention as explained hereinabove to remove the causes of light diffusion at the surfaces thereof as effectively as described in connection with the preparation of the block of Fig. 2. Hence, the acid surface clarifying step of the method of the invention may be applied at any stage during the process of shaping a production blank toward its ultimate form. For example, as illustrated by Fig. 3, a glass stock piece may be abraded at its end faces 20 to plane form, the abrading process being accomplished by any suitable method such as by planing with a bonded abrasive wheel or grinding with loose abrasive, or the like. The test block may then be treated to the acid clarifying step of the invention as explained hereinabove and will emerge therefrom in the form illustrated by Fig. 4. In such case the planed surfaces 20 will emerge as new surfaces 22 which are of minutely cusped and unpolished form, as distinguished from the finished form of prior art test blocks which have been optically ground and polished. Because the surfaces 22 are free of specular reflection characteristics, the test block of Fig. 4 may be inspected "dry" by transmitted light or may be wetted as in Fig. 7 and visual inspection may then be had by looking through the block from one surface 22 thereof toward the other similar surface with results comparing favorably with the results given by test blocks prepared through use of the most expensive preparation methods of the prior art.

As illustrated in Figs. 5 and 6 the invention is also applicable to inspection of production blanks, such as the prism blank 25 illustrated therein. In Fig. 5 the blank is illustrated as it comes from the mold or pressing die and attention is called to the fact that it is coated with a light-screening surface "skin" 26 due to contact with the mold or die parts, which makes impossible any satisfactory visual inspection of the interior thereof. Upon treatment of the blank of Fig. 5 by the acid clarifying process of the invention as explained hereinabove, the blank will attain the surface form of Fig. 6 which is similar to the surface forms of Figs. 2 and 4, as explained hereinabove. Thus, the prism blank is clarified at its outer surfaces so as to be susceptible of accurate visual inspection as explained hereinabove in connection with the test block 10, either with or without the assistance of a wetting agent; and the novel features and advantages of the invention are thus obtained through use of less expensive and simplified shop processes as compared to prior art test preparation methods.

It will be understood that although the invention has been illustrated and described hereinabove in connection with only a limited number of forms of stock pieces, it is applicable with equal facility to the preparation of many other forms of stock pieces in accord with the principles of the invention and as defined by the appended claims.

What is claimed is:

1. The method of preparing a glass stock piece having reduced transparency surfaces for visual inspection purposes including the steps of rough grinding a pair of opposed surface portions thereof to generally plane form, removing therefrom the surface light-screening substances resulting from said grinding processes by means of an acid reaction process adapted to avoid production of glass etched effects, and wetting said opposed surfaces with a suitable wetting agent.

2. The method of preparing and inspecting a glass stock piece having reduced transparency surfaces preliminary to further processing of said stock piece into a finished article, including the steps of clarifying a surface portion thereof by subjecting the latter to reaction with an acid composition adapted to avoid production of glass etching effects thereon, and inspecting the interior of said stock piece by viewing the latter through the surface thereof produced by said acid composition clarifying reaction.

3. The method of preparing and inspecting a glass stock piece having reduced transparency surfaces preliminary to further processing of said stock piece into a finished article, including the steps of clarifying a surface portion thereof by subjecting the latter to reaction with an acid composition including hydrofluoric and sulphuric acids in which the sulphuric acid ingredient dominates the hydrofluoric acid ingredient whereby said composition is adapted to eliminate said reduced transparency effects of said surfaces while avoiding production of glass etching effects thereon, wetting said clarified surface of said stock piece with a suitably transparent and refractive liquid wetting agent, and inspecting the interior of said stock piece by viewing the latter through said wetting agent and the surface of said stock piece produced by said acid composition clarifying reaction.

4. The method of preparing and inspecting a glass stock piece having reduced transparency surfaces preliminary to further processing of said stock piece into a finished article, including the steps of grinding a surface portion thereof and then subjecting the latter to clarifying reaction with an acid composition including hydrofluoric and sulphuric acids in which the sulphuric acid ingredient dominates the hydrofluoric acid ingredient whereby said composition is adapted to eliminate said reduced transparency effects of said surface while avoiding production of glass etching effects thereon, wetting said ground and clarified surface of said stock piece with a suitably transparent and refractive liquid wetting agent, and inspecting the interior of said stock piece by viewing the latter through said wetting agent and the surface of said stock piece produced by said acid composition clarifying reaction.

5. The method of preparing and inspecting a glass stock piece having reduced transparency surfaces preliminary to further processing of said stock piece into a finished article, including the steps of abrading a surface portion thereof and then subjecting the latter to clarifying reaction with an acid composition including hydrofluoric and sulphuric acids in which the sulphuric acid ingredient dominates the hydrofluoric acid ingredient whereby said composition is adapted to eliminate said reduced transparency effects of said surface while avoiding production of glass etching effects thereon, wetting said abraded and clarified surface of said stock piece with a suitably transparent and refractive liquid wetting agent, and inspecting the interior of said stock piece by viewing the latter through said wetting agent and the surface of said stock piece produced by said acid composition clarifying reaction.

6. The method of preparing and inspecting a glass stock piece having reduced transparency surfaces preliminary to further processing of said stock piece into a finished article, including the steps of roughly shaping a surface portion thereof and then subjecting the latter to clarifying reaction with an acid composition including hydrofluoric and sulphuric acids in which the sulphuric acid ingredient dominates the hydrofluoric acid ingredient whereby said composition is adapted to eliminate said reduced transparency effects of said surface while avoiding production of glass etching effects thereon, wetting said shaped and clarified surface of said stock piece with a suitably transparent and refractive liquid wetting agent, and inspecting the interior of said stock piece by viewing the latter through said wetting agent and the surface of said stock piece produced by said acid composition clarifying reaction.

7. The method of preparing and inspecting a calcium type glass stock piece having reduced transparency surfaces preliminary to further processing of said stock piece into a finished article, including the steps of clarifying a surface portion thereof by subjecting the latter to reaction with an acid composition including hydrofluoric and sulphuric acids in which the sulphuric acid ingredient dominates the hydrofluoric acid ingredient whereby said composition is adapted to eliminate said reduced transparency effects of said surfaces while avoiding production of glass etching effects thereon, wetting said clarified surface of said stock piece with a suitably transparent and refractive liquid wetting agent, and inspecting the interior of said stock piece by viewing the latter through said wetting agent and the surface of said stock piece produced by said acid composition clarifying reaction.

8. The method of preparing and inspecting a sodium type glass stock piece having reduced transparency surfaces preliminary to further processing of said stock piece into a finished article, including the steps of clarifying a surface portion thereof by subjecting the latter to reaction with an acid composition including hydrofluoric and sulphuric acids in which the sulphuric acid ingredient dominates the hydrofluoric acid ingredient whereby said composition is adapted to eliminate said reduced transparency effects of said surfaces while avoiding production of glass etching effects thereon, wetting said clarified surface of said stock piece with a suitably transparent and refractive liquid wetting agent, and inspecting the interior of said stock piece by viewing the latter through said wetting agent and the surface of said stock piece produced by said acid composition clarifying reaction.

9. The method of preparing a glass stock piece having reduced transparency surfaces for interior inspection purposes preliminary to further processing of said stock piece into a finished article, said method including the steps of clearing a reduced transparency surface portion of said stock piece by applying thereto for chemical reaction purposes a liquid composition including hydrofluoric and sulphuric acid aqueous solutions in which the sulphuric acid ingredient is present in quantity and strength sufficient to prevent production of light screening etched effects by the hydrofluoric acid ingredient upon said glass surface portion, and then subjecting the interior of said stock piece to visual inspection by viewing said stock piece through said cleared surface portion thereof.

10. The method of preparing and inspecting a barium containing glass stock piece having reduced transparency surfaces preliminary to further processing of said stock piece into a finished article including the steps of clarifying a surface portion thereof by subjecting the latter to reaction with an acid composition including hydrofluoric and phosphoric acids in which the phosphoric acid ingredient dominates the hydrofluoric acid ingredient whereby said composition is adapted to eliminate said reduced transparency effects of said surfaces while avoiding production of glass etching effects thereon, wetting said clarified surface of said stock piece with a suitably transparent and refractive liquid wetting agent, and inspecting the interior of said stock piece by viewing the latter through said wetting agent and the surface of said stock piece produced by said acid composition clarifying reaction.

11. The method of preparing and inspecting a barium containing glass stock piece having reduced transparency surfaces preliminary to further processing of said stock piece into a finished article, including the steps of grinding a surface portion thereof and then subjecting the latter to clarifying reaction with an acid composition including hydrofluoric and phosphoric acids in which the phosphoric acid ingredient dominates the hydrofluoric acid ingredient whereby said composition is adapted to eliminate said reduced transparency effects of said surface while avoiding production of glass etching effects thereon, wetting said ground and clarified surface of said stock piece with a suitably transparent and refractive liquid wetting agent, and inspecting the interior of said stock piece by viewing the latter through said wetting agent and the surface of said stock piece produced by said acid composition clarifying reaction.

12. The method of preparing and inspecting a barium containing glass stock piece having reduced transparency surfaces preliminary to further processing of said stock piece into a finished article, including the steps of abrading a surface portion thereof and then subjecting the latter to clarifying reaction with an acid composition including hydrofluoric and phosphoric acids in which the phosphoric acid ingredient dominates the hydrofluoric acid ingredient whereby said composition is adapted to eliminate said reduced transparency effects of said surface while avoiding production of glass etching effects thereon, wetting said abraded and clarified surface of said stock piece with a suitably transparent and refractive liquid wetting agent, and inspecting the interior of said stock piece by viewing the latter through said wetting agent and the surface of said stock piece produced by said acid composition clarifying reaction.

13. The method of preparing and inspecting a barium containing glass stock piece having reduced transparency surfaces preliminary to further processing of said stock piece into a finished article, including the steps of roughly shaping a surface portion thereof and then subjecting the latter to clarifying reaction with an acid composition including hydrofluoric and phosphoric acids in which the phosphoric acid ingredient dominates the hydrofluoric acid ingredient whereby said composition is adapted to eliminate said reduced transparency effects of said surface while avoiding production of glass etching effects thereon, wetting said shaped and clarified surface of said stock piece with a suitably transparent and refractive liquid wetting agent, and inspecting the interior of said stock piece by viewing the latter through said wetting agent and the surface of said stock piece produced by said acid composition clarifying reaction.

14. The method of preparing a barium containing glass stock piece having reduced transparency surfaces for interior inspection purposes preliminary to further processing of said stock piece into a finished article, said method including the steps of clearing a reduced transparency surface portion of said stock piece by applying thereto for chemical reaction purposes a liquid composition including hydrofluoric and phosphoric acid aqueous solutions in which the phosphoric acid ingredient is present in quantity and strength sufficient to prevent production of light screening etched effects by the hydrofluoric acid ingredient upon said glass surface portion, and then subjecting the interior of said stock piece to visual inspection by viewing said stock piece through said cleared surface portion thereof.

VICTOR WALKER.